(12) United States Patent
Li et al.

(10) Patent No.: US 9,469,730 B2
(45) Date of Patent: Oct. 18, 2016

(54) METHOD FOR PREPARING POLYAMIDEIMIDE FIBRID

(71) Applicant: JIANGSU JUXIAN SYNTHETIC MATERIAL CO., LTD., Zhenjiang, Jiangsu (CN)

(72) Inventors: Wenbin Li, Jiangsu (CN); Zhiping Mao, Jiangsu (CN); Zexiong Yi, Jiangsu (CN)

(73) Assignee: JIANGSU JUXIAN SYNTHETIC MATERIAL CO., LTD., Zhenjiang, Jiangsu (CN)

( * ) Notice: Subject to any disclaimer, the term of this patent is extended or adjusted under 35 U.S.C. 154(b) by 0 days.

(21) Appl. No.: 14/425,554

(22) PCT Filed: Apr. 16, 2014

(86) PCT No.: PCT/CN2014/075473
§ 371 (c)(1),
(2) Date: Mar. 3, 2015

(87) PCT Pub. No.: WO2015/106498
PCT Pub. Date: Jul. 23, 2015

(65) Prior Publication Data
US 2016/0046768 A1 Feb. 18, 2016

(30) Foreign Application Priority Data

Jan. 20, 2014 (CN) .......................... 2014 1 0025194

(51) Int. Cl.
*C08G 73/14* (2006.01)
*C08L 79/08* (2006.01)
*D21H 13/26* (2006.01)
*C08G 73/10* (2006.01)

(52) U.S. Cl.
CPC ............ *C08G 73/14* (2013.01); *C08G 73/1067* (2013.01); *C08L 79/08* (2013.01); *D21H 13/26* (2013.01)

(58) Field of Classification Search
CPC ...... C08G 69/32; C08G 73/10; C08G 73/14; D01F 6/605; C08L 79/08
See application file for complete search history.

(56) References Cited

U.S. PATENT DOCUMENTS

| | | | | |
|---|---|---|---|---|
| 4,187,143 A | * | 2/1980 | Sander | ..................... D01D 5/40 162/157.3 |
| 5,886,131 A | * | 3/1999 | Yao | ........................ C07C 217/90 528/125 |
| 2013/0260020 A1 | * | 10/2013 | Tomikawa | ............ H01M 4/134 427/58 |

* cited by examiner

*Primary Examiner* — Gregory Listvoyb
(74) *Attorney, Agent, or Firm* — Kile Park Reed & Houtteman LLC

(57) ABSTRACT

The invention provides a method for preparing a polyamideimide fibrid, characterized by comprising the following specific steps: step 1: reacting diamine monomer with trimellitic anhydride chloride in an aprotic polar solvent in the presence of a catalyst to obtain a polyamide acid polymer, and carrying out chemical cyclization dehydration on the polyamide acid polymer to obtain a polyamideimide polymer solution; step 2: diluting the polyamideimide polymer solution, adding the diluted polyamideimide polymer solution and precipitation solution to a precipitation machine, and mixing to obtain a polyamideimide fibrid suspension; and step 3: washing, filtering and drying the polyamideimide fibrid suspension to obtain a polyamideimide fibrid. The invention is characterized by simple process, the size and shape of the fibrid are easy to be controlled, and the fibrid can be directly used to prepare high performance paper.

9 Claims, No Drawings

METHOD FOR PREPARING POLYAMIDEIMIDE FIBRID

FIELD OF THE INVENTION

The invention relates to a method for preparing a polyamideimide fibrid.

DESCRIPTION OF THE RELATED ART

High performance paper is a material having excellent performances such as high strength, high modulus, light weight, heat resistance, insulation, flame retardance, chemical corrosion resistance, radiation resistance, fatigue resistance and good dimensional stability. The material is widely applied to high temperature resistant insulating materials, electronic materials and structural materials, and has been widely used in the power, electronic and transportation fields. As an important strategic material and high-tech material, high performance paper has been always a research focus in America, Japan, Russia and other developed countries. High performance paper is mainly prepared from aromatic amide polymers (aromatic polyamide, polyimide and polyamideimide). Paper-based composite materials prepared from such polymers have strong mechanical properties, good dielectric properties and flexible designability. At present, high performance paper in the market is mainly prepared by using aromatic polyamide fiber (aramid) as a base material, and includes meta-aromatic synthetic paper and para-aromatic synthetic paper, such as meta-aramid paper (trade name: NOMEX) and para-aramid paper (trade name: KEVLAR) manufactured by DuPont.

Compared with overseas vigorous development, research of domestic high performance paper seriously lags behind, and demands are met by relying entirely on importing expensive imported materials at present. Main reasons for the lag are as follows: one is that the production technology for important raw materials such as pulp lags behind, and the other is that the technology involves multidisciplinary fields including papermaking, materials, surface chemistry, electromagnetism, etc., and no relevant research exists in China. As a basic raw material of high performance paper, pulp has gap filling and binding effects in the structure of paper, and determines the final performance of paper. Key technology for development of paper lies in form control and non-rigidity. Two methods are mainly used to make pulp: one method is to directly prepare polymer solution by the action of shear force, pulp made by such method is fibrid such as meta-aramid, and the other method is to spin and cut the polymer to prepare pulp such as para-aramid by grinding chopped fiber. By comparison, the first method is simple, easy to be controlled product structure, and suitable for continuous production, and the second method has higher requirements for equipment, and high consumption of equipment. The first method is generally used to prepare pulp of high polymers, but because some polymers can not be dissolved in normal solvent, the second method has to be used to prepare the pulp. For example, para-aramid can be only dissolved in concentrated sulfuric acid, the pulp thereof is prepared by grinding chopped fiber.

Compared with aromatic polyamide polymers, polyimide and polyamideimide have better chemical stability and mechanical strength due to existence of imide groups, and high performance paper-based materials prepared therefrom have broader development space. But because of solubility problem, fibrid of both the polyimide and polyamideimide can not be prepared by beating. In addition, it is difficult to produce fiber of both the polyimide and polyamideimide, and pulp made by grinding chopped fiber has poor performance, restricting their applications to high performance paper.

Meta-aramid paper has been used for more than 50 years since invention thereof, and high performance paper currently in the market mainly gives priority to aromatic polyamide paper. Due to restrictions of preparation conditions for pulp, polyimide and polyamideimide-based high performance paper does not reflect its advantages in performances. How to prepare the pulp by a simple method has far-reaching impacts on the development of high performance fiber paper.

U.S. Pat. No. 6,294,049B1 discloses a method for manufacturing a polyimide paper, the main manufacturing process is as follows: preparing polyamide acid fibrid from polyamide acid solution through wet spinning, then obtaining wet polyamide acid paper by wet papermaking technology, and finally preparing the polyimide paper through chemical cyclization or thermal cyclization. Polyamide acid fiber can be directly prepared by the method rather than polyimide fibrid. As polyamide made into paper has to be cyclized, a large amount of water is generated in the process, reducing the physical and chemical properties of insulating paper, and making the production process complex.

Japanese inventive patent 2003-96698 discloses a method for producing a heat resistant insulating paper, comprising the following steps: cutting polyimide fiber into 3 to 12 mm chopped fiber, uniformly dispersing the chopped fiber in water under the action of a pulper to prepare pulp, and then obtaining wet polyimide paper by wet papermaking technology. However, special cutting devices are required for polyimide fiber due to high strength and rigidity, thus equipment and energy will be greatly consumed in the processes of cutting into chopped fiber and fibrillation. Meanwhile, during fibrillation beating, the surface of fiber is damaged, affecting the performance of pulp.

Mikio Furukawa, et al. (Japanese) invented a new polyimide impregnated paper in 2001. The manufacturing method of the polyimide impregnated paper is as follows: impregnating platellites composed of chopped polyamide fiber in an aqueous solution of the former polyimide polymer, and heating the solution to transform the former polyimide polymer into polyimide, thus obtaining the polyimide impregnated paper. However, in the method, the former polyimide polymer must be water-soluble, and the solubility has to be higher than 3 wt %, it is very difficult for polyamide acid which is easy to precipitate in water, and heating is required for cyclization after being made into paper, which will reduce the performance of paper.

SUMMARY OF THE INVENTION

With regard to the preparation situations of polyamideimide pulp at present, the purpose of the invention is to provide a method for preparing a polyamideimide fibrid to make high performance fiber paper.

In order to achieve the purpose, the invention provides a method for preparing a polyamideimide fibrid, characterized by comprising the following specific steps:

step 1: reacting diamine monomer with trimellitic anhydride chloride in an aprotic polar solvent in the presence of a catalyst to obtain a polyamide acid polymer, and carrying out chemical cyclization dehydration on the polyamide acid polymer to obtain a polyamideimide polymer solution;

step 2: diluting the polyamideimide polymer solution, adding the diluted polyamideimide polymer solution and precipitation solution to a precipitation machine, and mixing to obtain a polyamideimide fibrid suspension; and step 3: washing, filtering and drying the polyamideimide fibrid suspension to obtain a polyamideimide fibrid.

Preferably, the chemical cyclization dehydration comprises the following specific steps: adding acetic anhydride and mixing to obtain the polyamideimide polymer solution.

More preferably, in the step 1, the weight ratio of the aprotic polar solvent, the diamine monomer, the trimellitic anhydride chloride, the catalyst and the acetic anhydride is 150:15-40:15-40:5-10:5-15.

Preferably, the diamine monomer has a structure of $H_2N-R-NH_2$, wherein R is a aromatic group.

More preferably, the diamine monomer is one or a mixture of more than two compounds selected from p-phenylenediamine, m-phenylenediamine, 3,4'-diaminodiphenyl ether, 4,4'-diaminodiphenyl ether, 4,4'-diaminodiphenyl sulfide, 4,4'-diaminodiphenyl methane, 3,3'-dimethylbenzidine, 2,2'-dimethylbenzidine, 3,3'-dichlorobenzidine, 2,2'-dichlorobenzidine, 3,3'-dihydroxybenzidine, 3,3'-dimethoxybenzidine, 2,4-diaminotoluene, 2,6-diaminotoluene, 3,3'-dichloro-4,4'-diaminodiphenyl methane, 1,3-bis(3-aminophenyl)propane, 2,2-bis(4-aminophenyl) hexafluoropropane, 2,2'-bis(trifluoromethyl)-4,4'-diaminodiphenyl, a,a-bis(4-aminophenyl)-1,4-diisopropylbenzene, 4,4'-dithiodiphenylamine, 4,4'-methylenedianiline, 4,4'-diaminobenzophenone, 3,3'-diaminobenzophenone, 4,4'-diaminodiphenyl sulphone and 4,4'-diamido-4"-hydroxytriphenylmethane.

Preferably, the mass concentration of the polyamideimide polymer solution obtained in the step 1 is 8 to 40%, the inherent viscosity is 1 to 15 dL/g, and the mass concentration of the diluted polyamideimide polymer solution obtained in the step 2 is 2 to 30%.

Preferably, the mass concentration of the polyamideimide polymer solution obtained in the step 1 is 8 to 15%, the inherent viscosity is 4.2 dL/g, and the mass concentration of the diluted polyamideimide polymer solution obtained in the step 2 is 10%.

Preferably, the precipitation solution in the step 2 is composed of 2 to 3 parts of water (by weight), 5 to 8 parts of NMP (by weight) and 1 to 2 parts of calcium chloride (by weight).

Preferably, the precipitation solution in the step 2 is composed of 2 parts of water (by weight), 7 parts of NMP (by weight) and 1 part of calcium chloride (by weight).

More preferably, the weight ratio of the diluted polyamideimide polymer solution and the precipitation solution in the step 2 is 1:5-20.

Preferably, the mixing speed in the step 2 is 1000 to 7000 rpm.

More preferably, the mixing speed in the step 2 is 4000 rpm.

Preferably, the mass concentration of the polyamideimide fibrid suspension in the step 2 is 0.1 to 15%.

Preferably, the mass concentration of the polyamideimide fibrid suspension in the step 2 is 0.8%.

The mean length of the polyamideimide fibrid obtained in the invention is 0.1 to 10.0 mm, and the specific surface area is 10 to 70 $m^2/g$.

Preferably, the mean length of the polyamideimide fibrid obtained in the invention is 0.8 mm, and the specific surface area is 55 $m^2/g$.

A polyamideimide polymer soluble in N-methyl pyrrolidone is prepared by selecting a polymerisable monomer, a catalyst and polymerization conditions in the invention, and the polymer is under the action of strong shear force in a precipitation solution to obtain a polyamideimide fibrid which can be directly applied to preparation of high performance paper.

Compared with the prior art, the invention has the following beneficial effects:

Soluble polyamideimide pulp is used to prepare a fibrid in the invention. In such way, the process is simple, the size and shape of the fibrid are easy to be controlled, and the fibrid can be directly used to prepare high performance paper. Compared with technology for making paper from polyamide acid or polyamide acid fibrid, the invention is free of thermal cyclization process, avoiding degradation of product performance due to water vapor from thermal cyclization. Compared with methods for preparing polyimide pulp by spinning, cutting, beating and other processes to make paper, the preparation process has low requirements for equipment and low energy consumption.

DESCRIPTION OF THE PREFERRED EMBODIMENTS

The invention will be further described in combination with the following preferred embodiments. The preferred embodiments are only used to further describe the invention, but not limit the protection scope of the claims of the invention.

EXAMPLE 1

A method for preparing a polyamideimide fibrid comprises the following specific steps: successively adding 150 g N-methyl pyrrolidone (NMP), 10 g p-phenylenediamine and 10 g 3,4'-diaminodiphenyl ether to a reaction flask, mixing and cooling to 0□, then adding 35 g trimellitic anhydride chloride and 10 g catalyst pyridine for reaction for 24 h under the protection of nitrogen to obtain a polyamide acid polymer, then adding 10 g acetic anhydride, and mixing for 20 h at 25□ for chemical cyclization dehydration to obtain a polyamideimide polymer solution with mass concentration of 15% and inherent viscosity of 4.0 dL/g; diluting the polyamideimide polymer solution to a mass concentration of 6%, adding 10 g diluted polyamideimide polymer solution and 150 g precipitation solution which is composed of 2 parts of water (by weight), 6 parts of NMP (by weight) and 2 parts of calcium chloride (by weight) to a precipitation machine, and mixing for 2 min at a set mixing speed of 4500 rpm to obtain a polyamideimide fibrid suspension with mass concentration of 1.5%; then washing, filtering and drying the polyamideimide fibrid suspension to obtain a polyamideimide fibrid with abundant surface hairiness having mean length of 1.4 mm and specific surface area of 43 $m^2/g$.

EXAMPLE 2

A method for preparing a polyamideimide fibrid comprises the following specific steps: adding 150 g N,N-dimethylformamide (DMF), 10 g m-phenylenediamine, 5 g 3,4'-diaminodiphenyl ether and 5 g 2,4-diaminotoluene to a reaction flask, mixing and cooling to 0□, then adding 28 g trimellitic anhydride chloride and 7 g catalyst pyridine for reaction for 24 h under the protection of nitrogen to obtain a polyamide acid polymer, then adding 5 g acetic anhydride, and mixing for 20 h at 25□ for chemical cyclization dehydration to obtain a polyamideimide polymer solution with mass concentration of 20% and inherent viscosity of 3.3 dL/g; diluting the polyamideimide polymer solution to a mass concentration of 10%, adding 10 g diluted polyamideimide polymer solution and 80 g precipitation solution which is composed of 3 parts of water (by weight), 5 parts of NMP (by weight) and 2 parts of calcium chloride (by weight) to a precipitation machine, and mixing for 0.5 min at a set mixing speed of 4000 rpm to obtain a polyamideimide fibrid suspension with mass concentration of 1.0%; then washing, filtering and drying the polyamideimide fibrid suspension to obtain a polyamideimide fibrid with abundant surface hairiness having mean length of 1.0 mm and specific surface area of 54 $m^2/g$.

EXAMPLE 3

A method for preparing a polyamideimide fibrid comprises the following specific steps: adding 150 g N,N-dimethylacetamide (DMAC), 8 g p-phenylenediamine, 12 g 3,4'-diaminodiphenyl ether and 5 g 4,4'-diaminodiphenyl methane to a reaction flask, mixing and cooling to 0□, then adding 20 g trimellitic anhydride chloride and 6 g catalyst pyridine for reaction for 24 h under the protection of nitrogen to obtain a polyamide acid polymer, then adding 11 g acetic anhydride, and mixing for 20 h at 25□ for chemical cyclization dehydration to obtain a polyamideimide polymer solution with mass concentration of 10% and inherent viscosity of 4.2 dL/g; diluting the polyamideimide polymer solution to a mass concentration of 4%, adding 10 g diluted polyamideimide polymer solution and 200 g precipitation solution which is composed of 2 parts of water (by weight), 7 parts of NMP (by weight) and 1 part of calcium chloride (by weight) to a precipitation machine, and mixing for 3 min at a set mixing speed of 2500 rpm to obtain a polyamideimide fibrid suspension with mass concentration of 0.8%; then washing, filtering and drying the polyamideimide fibrid suspension to obtain a polyamideimide fibrid with abundant surface hairiness having mean length of 1.1 mm and specific surface area of 51 $m^2/g$.

EXAMPLE 4

A method for preparing a polyamideimide fibrid comprises the following specific steps: adding 150 g N-methyl pyrrolidone (NMP), 8 g m-phenylenediamine, 8 g 3,4'-diaminodiphenyl ether and 10 g 4,4'-diaminodiphenyl methane to a reaction flask, mixing and cooling to 0□, then adding 27 g trimellitic anhydride chloride and 8 g catalyst pyridine for reaction for 24 h under the protection of nitrogen to obtain a polyamide acid polymer, then adding 15 g acetic anhydride, and mixing for 20 h at 25□ for chemical cyclization dehydration to obtain a polyamideimide polymer solution with mass concentration of 14% and inherent viscosity of 3.6 dL/g; diluting the polyamideimide polymer solution to a mass concentration of 7%, adding 10 g diluted polyamideimide polymer solution and 120 g precipitation solution which is composed of 2 parts of water (by weight), 5 parts of NMP (by weight) and 3 parts of calcium chloride (by weight) to a precipitation machine, and mixing for 2.5 min at a set mixing speed of 6000 rpm to obtain a polyamideimide fibrid suspension with mass concentration of 2.5%; then washing, filtering and drying the polyamideimide fibrid suspension to obtain a polyamideimide fibrid with abundant surface hairiness having mean length of 0.2 mm and specific surface area of 58 $m^2/g$.

EXAMPLE 5

The polyamideimide fibrid obtained in examples 1 to 4 is uniformly dispersed in water to make raw paper through a paper machine, and finally hot formed at 300□ by a high temperature calendar to obtain polyamideimide paper.

What is claimed is:

1. A method for preparing a polyamideimide fibrid, characterized by comprising the following specific steps:
    step 1: reacting diamine monomer with trimellitic anhydride chloride in an aprotic polar solvent in the presence of a catalyst to obtain a polyamide acid polymer, and carrying out chemical cyclization dehydration on the polyamide acid polymer to obtain a polyamideimide polymer solution;
    step 2: diluting the polyamideimide polymer solution, adding the diluted polyamideimide polymer solution and precipitation solution to a precipitation machine, and mixing to obtain a polyamideimide fibrid suspension; and
    step 3: washing, filtering and drying the polyamideimide fibrid suspension to obtain a polyamideimide fibrid; wherein
    the precipitation solution in the step 2 is composed of 2 to 3 parts of water (by weight), 5 to 8 parts of NMP (by weight) and 1 to 2 parts of calcium chloride (by weight).

2. The method for preparing a polyamideimide fibrid of claim 1, characterized in that the chemical cyclization dehydration comprises the following specific steps: adding acetic anhydride and mixing to obtain the polyamideimide polymer solution.

3. The method for preparing a polyamideimide fibrid of claim 1, characterized in that in the step 1, the weight ratio of the aprotic polar solvent, the diamine monomer, the trimellitic anhydride chloride, the catalyst and the acetic anhydride is 150:15-40:15-40:5-10:5-15.

4. The method for preparing a polyamideimide fibrid of claim 1, characterized in that the diamine monomer has a structure of $H_2N$—R—$NH_2$, wherein R is a aromatic group.

5. The method for preparing a polyamideimide fibrid of claim 1, characterized in that the diamine monomer is one or a mixture of more than two compounds selected from p-phenylenediamine, m-phenylenediamine, 3,4'-diaminodiphenyl ether, 4,4'-diaminodiphenyl ether, 4,4'-diaminodiphenyl sulfide, 4,4'-diaminodiphenyl methane, 3,3'-dimethylbenzidine, 2,2'-dimethylbenzidine, 3,3'-dichlorobenzidine, 2,2'-dichlorobenzidine, 3,3'-dihydroxybenzidine, 3,3'-dimethoxybenzidine, 2,4-diaminotoluene, 2,6-diaminotoluene, 3,3'-dichloro-4,4'-diaminodiphenyl methane, 1,3-bis(3-aminophenyl)propane, 2,2-bis(4-aminophenyl)hexafluoropropane, 2,2'-bis(trifluoromethyl)-4,4'-diaminodiphenyl, α,α-bis(4-aminophenyl)-1,4-diisopropylbenzene, 4,4'-dithiodiphenylamine, 4,4'-methylenedianiline, 4,4'-diaminobenzophenone, 3,3'-diaminobenzophenone, 4,4'-diaminodiphenyl sulphone and 4,4'-diamido-4"-hydroxytriphenylmethane.

6. The method for preparing a polyamideimide fibrid of claim 1, characterized in that the mass concentration of the polyamideimide polymer solution obtained in the step 1 is 8 to 40%, the inherent viscosity is 1 to 15 dL/g, and the mass concentration of the diluted polyamideimide polymer solution obtained in the step 2 is 2 to 30%.

7. The method for preparing a polyamideimide fibrid of claim 1, characterized in that the mixing speed in the step 2 is 1000 to 7000 rpm.

8. The method for preparing a polyamideimide fibrid of claim 1, characterized in that the mass concentration of the polyamideimide fibrid suspension in the step 2 is 0.1 to 15%.

9. The method for preparing a polyamideimide fibrid of claim 1, characterized in that the mean length of the polyamideimide fibrid obtained is 0.1 to 10.0 mm, and the specific surface area is 10 to 70 m$^2$/g.

* * * * *